United States Patent
Silver et al.

(10) Patent No.: US 8,159,337 B2
(45) Date of Patent: Apr. 17, 2012

(54) SYSTEMS AND METHODS FOR IDENTIFICATION OF LOCATIONS

(75) Inventors: Edward Michael Silver, Atlanta, GA (US); Maria Adamczyk, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1210 days.

(21) Appl. No.: 10/784,383

(22) Filed: Feb. 23, 2004

(65) Prior Publication Data
US 2005/0184866 A1 Aug. 25, 2005

(51) Int. Cl.
*G08B 1/08* (2006.01)
(52) U.S. Cl. ............ 340/539.13; 340/988; 340/995.1; 340/546; 434/289; 701/207; 701/213
(58) Field of Classification Search ............. 340/539.13
See application file for complete search history.

(56) References Cited

U.S. PATENT DOCUMENTS

| | | | | | |
|---|---|---|---|---|---|
| 5,162,828 | A | * | 11/1992 | Furness et al. | 353/122 |
| 5,254,852 | A | * | 10/1993 | Filipovich et al. | 250/214 VT |
| 5,682,332 | A | * | 10/1997 | Ellenby et al. | 702/150 |
| 5,815,411 | A | * | 9/1998 | Ellenby et al. | 702/150 |
| 5,825,480 | A | * | 10/1998 | Udagawa | 356/138 |
| 6,046,712 | A | * | 4/2000 | Beller et al. | 345/8 |
| 6,141,091 | A | * | 10/2000 | Ball | 356/146 |
| 6,256,401 | B1 | * | 7/2001 | Whited | 382/110 |
| 6,324,469 | B1 | * | 11/2001 | Okude et al. | 340/990 |
| 6,349,001 | B1 | * | 2/2002 | Spitzer | 359/618 |
| 6,452,544 | B1 | * | 9/2002 | Hakala et al. | 342/357.13 |
| 6,470,264 | B2 | * | 10/2002 | Bide | 340/546 |
| 6,529,209 | B1 | * | 3/2003 | Dunn et al. | 345/629 |
| 6,604,049 | B2 | * | 8/2003 | Yokota | 340/988 |
| 2002/0044152 | A1 | * | 4/2002 | Abbott et al. | 345/629 |

OTHER PUBLICATIONS

Mark Moeglein and Norman Krasner, An Introduction to SnapTrack Server-Aided GPS Technology.
Cellocate Beacon Network, Cell-Loc Inc., Feb. 2002, Version 1.6, pp. 1-13, Calgary, Canada.
Tobias Hollerer and John Pavlik, Situated Documentaries: Embedding Multimedia Presentations in the Real World, Proceedings of ISWC Oct. 18-19, 1999, pp. 79-86, San Francisco.
Comparison of offerings from the two main solution providers—Snap Track and Cell-Loc, www.cell-loc.com.

\* cited by examiner

*Primary Examiner* — Eric M Blount
(74) *Attorney, Agent, or Firm* — Cantor Colburn LLP

(57) ABSTRACT

A viewing apparatus provides a user with a view of his or her surroundings and enables the user to select a location from the view of the surroundings for identification. The viewing apparatus transmits location information regarding the selected location to a location identification device. In response to receipt of the location information, the location identification device uses the location information to determine identification information for the location. The location identification device transmits the identification information to the viewing apparatus, which displays the identification information on the view of the surroundings, preferably in association with the selected location. The identification information may include an address, a telephone number, and/or other information.

6 Claims, 2 Drawing Sheets

SYSTEMS AND METHODS FOR IDENTIFICATION OF LOCATIONS

FIELD OF THE INVENTIONS

The inventions generally relate to location identifiers, and more particularly, relate to methods and systems that identify a location and display identification information regarding the location.

BACKGROUND OF THE INVENTIONS

Among the problems faced by a courier or other delivery person in making a delivery is finding the correct location for the delivery. The delivery person may be provided with an address, but may be unable to find a location matching the address. The delivery person may be unable to find the matching location because address information may not be displayed or clearly visible on the location or even on locations in the general area of the delivery. Further, displayed addresses may be incorrect, confusing, or unreadable.

The problem of identifying the correct location for a delivery has been addressed by some delivery companies by a requirement that a telephone number be supplied for any delivery. For example, a person sending flowers may be required to supply a telephone number associated with the location where the flowers are to be delivered. If the delivery person has trouble finding the location, the delivery person may call the telephone number for directions or other information. A telephone number associated with the delivery location, however, does not solve all cases where finding the delivery location is a problem. The supplied telephone number may be incorrect or not associated with the delivery location. There may be nobody present at the location to answer the call, or the person answering the call may not have sufficient information to assist the delivery person.

In sum, there is a need for a way to identify a location when address information is not displayed on the location or the displayed address information is incorrect, confusing, unreadable, or otherwise problematic. The need remains even in those cases where a telephone number is provided for use in addressing problems in the identification of the location.

SUMMARY OF THE INVENTIONS

Generally stated, the inventions relate to methods and systems for identifying a location through the use of a viewing apparatus that allows a user to select or provide the location from the field of view of the viewing apparatus. The user also may select or provide the orientation of the location or view. The viewing apparatus transmits information regarding the selected location to a location identification device. The transmitted information may include the orientation. The location information as well as the orientation may be used by the location identification device to identify the selected location. The location identification device provides the identification information to the viewing apparatus. The identification information regarding the selected location is displayed in the field of view of the viewing apparatus, preferably in association with the selected location.

Advantageously, the inventions allow a courier or other delivery person to speed up deliveries by providing identifying or other information to the courier or other delivery person on potential delivery locations. The courier may use the information to confirm he or she has arrived at the correct location for the delivery. The courier need no longer be bothered by incorrect, incomplete, or incomprehensible address information displayed on a potential delivery location.

Exemplary embodiments of the inventions include methods and systems that provide a viewing apparatus enabling a user to have a view of his or her surroundings. The viewing apparatus also allows the user to select a location for identification from the view of the surroundings. The viewing apparatus in addition may allow the user to select an orientation. In response to the selection, the viewing apparatus transmits location information regarding the selected location to a location identification device. The location information may include orientation. The device uses the location information to determine identification information for the location. The device then transmits the identification information to the viewing apparatus, which displays the identification information on the view of the surroundings. The identification information may include an address, a telephone number, or other information associated with the location selected for identification.

Advantageously, the inventions satisfy the need for a way to identify a location when address information is not displayed on the location or the displayed address information is incorrect, confusing, unreadable, or otherwise problematic. By satisfying such need, the inventions facilitate the prompt and accurate identification of a location for delivery and other purposes.

Other features and advantages of the inventions may be more clearly understood and appreciated from a review of the following detailed description and by reference to the appended drawings and claims.

DETAILED DESCRIPTION

Figure 1:
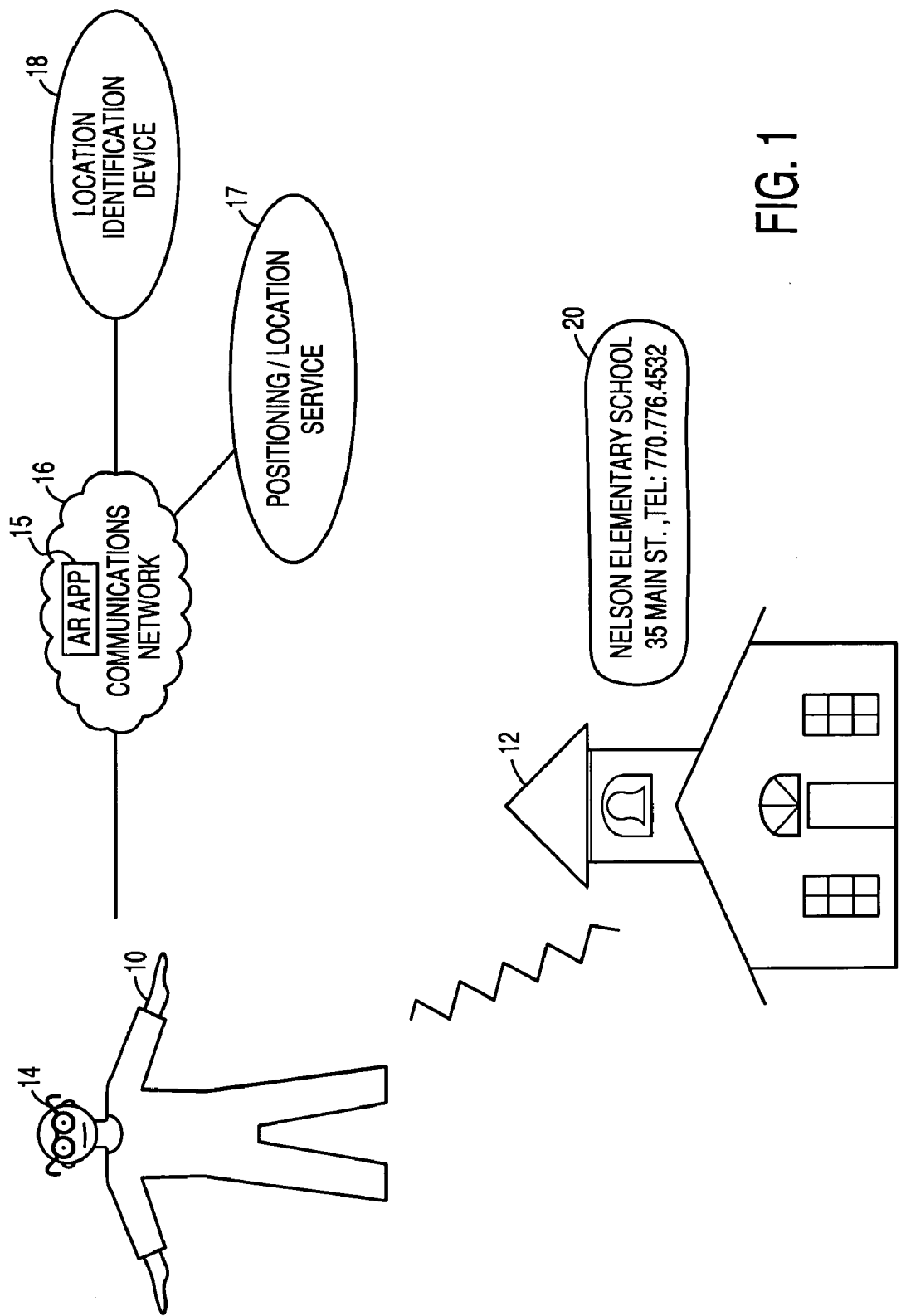
FIG. 1 illustrates an exemplary environment for use of the inventions.

FIG. 1 illustrates an exemplary environment and use of an embodiment of the inventions. In this example, a delivery person 10 is assigned to make a delivery to a location 12 that has been identified as a school. Upon arriving in the general area of the school 12, the delivery person 10 may use the exemplary embodiment to confirm that a building he or she believes is the location for the delivery is in fact the correct location.

In this exemplary embodiment, the delivery person 10 is wearing a viewing apparatus 14 that provides him or her with a display of his or her surroundings. The display provided by the viewing apparatus 14 also may be referred to as the field of view of the apparatus. The delivery person 10 is able to select a location from the display of the surroundings for identification. The location may include or reference the delivery person's position and/or orientation. In this example, the delivery person 10 may select the school 12 as the location from the field of view of the apparatus. In response, the viewing apparatus 14 transmits information regarding the location through a communications network 16 to a location identification device 18. The information regarding the location may include any type of information relating to the location such as its geographical position, longitude/latitude, etc. The information may be provided in X-Y coordinates, specified map coordinates, global position coordinates, or otherwise. The information regarding the location may include the orientation of the location vis-à-vis the delivery person, and/or the display of the surroundings provided to the delivery person. Alternatively, the information regarding the location may include the orientation of the location vis-à-vis some other point of reference.

Generally stated, the location identification device 18 uses the location information to identify the location. The location identification device 18 may identify the location itself, or may refer to and/or combine information with other sources to identify the location. Once the location is identified, the location identification device 18 transmits the identification information through the communications network 16 to the viewing apparatus 14 worn by the delivery person 10. In this example, the identification information regarding the school is illustrated in FIG. 1 as including the name of the school, its street address, and a telephone number 20 The viewing apparatus 14 displays the identification information regarding the school 20 on the field of the view of the apparatus. The identification information matches the address given to the delivery person 10 for making the delivery. Advantageously, the delivery person 10 may use the exemplary embodiment to receive confirmation that the location he or she selected in the field of view of the device is the correct delivery location.

An exemplary viewing apparatus may be deployed or associated with glasses, eyewear, goggles, headwear, or other apparatus that provide the user with a display of his or her surroundings. In other words, the user views the surroundings by looking at or through the display of the viewing apparatus. The viewing apparatus may provide a user with a "realistic" view of his or her surroundings. The view is referred to as "realistic" when the viewing apparatus generally provides the user with the same view as if the user were not using the viewing apparatus to view the surroundings. Advantageously, the inventions allow the user to augment this realistic view of the surroundings by having identification information related to location(s) in the surroundings displayed in the field of view of the viewing apparatus. Thus, a display including identification information regarding a location may be referred to as an "augmented reality" display. Alternatively, the view of the surroundings need not be realistic.

An exemplary viewing apparatus as may be used with the inventions may be based on technologies that include positioning technologies such as the Global Positioning System (GPS), location-based computing, and/or location-aware mobile systems. An exemplary viewing apparatus also may allow for head tracking or changing orientation relating to the user. Thus, as the user turns or moves his or her head or changes his or her orientation, the display provided by the viewing apparatus may change accordingly.

Further, an exemplary viewing apparatus may provide mechanism(s) that allow a user to select a location(s) from the field of view of the apparatus. Such mechanisms may be based on gaze selection or other methods.

Moreover, an exemplary viewing apparatus may include one or more means for the exchange of communications such as wireless communication features, paging features, etc. For example, once the user selects a location from the field of view of the apparatus, information regarding the location may be transmitted via wireless communications by the viewing apparatus through a communications network 16 to a location identification device 18.

Examples of devices that may serve or may be modified to serve as a viewing apparatus for use with the inventions are described in the following materials which are incorporated herein by reference: *Situated Documentaries: Embedding Multimedia Presentation in the Real World* communications network 16 to the identification service such as implemented by AR APP 15.

Examples of devices that may serve or may be modified to serve as a viewing apparatus for use with the inventions are described in the following materials, which are incorporated herein by reference: *Situated Documentaries. Embedding Multimedia Presentation in the Real World* by Tobias Hollerer, Steven Feiner, and John Pavlik as published in the Proceedings of ISWC '99 (International Symposium on Wearable Coamputers), San Francisco, Calif., Oct. 18-19, 1999, pp. 79-86; *An Introduction to SnapTrack™ Server-Aided GPS Technology* by Mark Moeglein and Norman Krasner, and *Cellocate Beacon™ Network*, published by Cell-Inc., 220, 3015 5$^{th}$ Avenue NE, Calgary AB T2A 6T8, Canada, Version 1.6, February 2002.

The exemplary viewing apparatus has been described and illustrated in FIG. 1 as goggles or headwear, but viewing apparatus should not be so limited. A viewing apparatus may include a handheld or other device that includes the functionality described herein. For example, a viewing apparatus may be mounted in the cab of a delivery vehicle for use as needed by a delivery person. As another example, an exemplary viewing apparatus may allow the user to view his or her surroundings and make use of the exemplary embodiment by using only one of his or her two eyes with the viewing apparatus.

As noted above, once the user such as the delivery person 10 selects a location for identification, target data is transmitted by the exemplary viewing apparatus 14. The target data may include any type of information relating to the location such as its geographical position, longitude/latitude, features, characteristics, etc. The target data may be transmissions regarding the exchange of information between the viewing apparatus and the location identification device 18. Thus, the communications network 16 connecting the viewing apparatus 14 and the location identification device 18 may include wireless or wireline networks (such as the public switched telephone network PSTN) and/or data networks such as the Internet or other global data communications networks. Further, the communications network 16 may include gateway(s) or other interfaces as necessary with respect to the exchange of information between the viewing apparatus 14 and the location identification device 18. For example, the communications network 16 may include a WiFI gateway.

As noted, the exemplary location identification device 18 receives the location information from the viewing apparatus 14, uses the location information to identify the location, and transmits the identification information to the viewing apparatus 14. To accomplish such functions, the location identification device 18 may include or have access to features and functionality for execution of the identification service. For example, the location identification device 18 may include or have access to one or more application servers or other devices or modules for execution of the service. The location identification device 18 may include or have access to one or more databases or other information resources that provide for the identification of a location based on location information.

For example, the location identification device may include or have access to a database and database engine that maps location information to identification information. The translation between location information and identification information may include one, two or more steps or actions, and/or information resources. For example, the location information provided by the viewing apparatus may be provided in geographical coordinates, which then may be translated into identification information such as an address of the location.

As noted, the location information provided by the viewing apparatus may be translated through one or more actions or steps and by recourse to one or more databases or other information resources into identification information. Preferably, the identification information may include a name, address, and telephone number associated with the location.

The location identification device 18 is illustrated in FIG. 1 as a single unit, but it should not be so limited. As described above, the functionality of the location identification device 18 may be communicatively distributed among one or more other elements and/or services. In an exemplary embodiment, the location identification device 18 or parts thereof may be incorporated as part of the viewing apparatus 14. Incorporation of the location identification device or parts thereof in the viewing apparatus 14 may obviate the necessity of the communications transmission across the communications network 16 such as illustrated in FIG. 1.

In the example described with reference to FIG. 1, the identification information regarding the school 20 includes the name of the school, the street address, and a telephone number. Identification information, however, may include more or less data relating to the location selected by the user. Moreover, identification information is not limited to text, but may include graphics or other data. For example, some identification information may only include a street address or a telephone number. In some cases, identification information may not be obtainable. In that case, the exemplary embodiment may display a message such "information cannot be found" or "identification cannot be made" on the display of the viewing apparatus 14.

Figure 2:
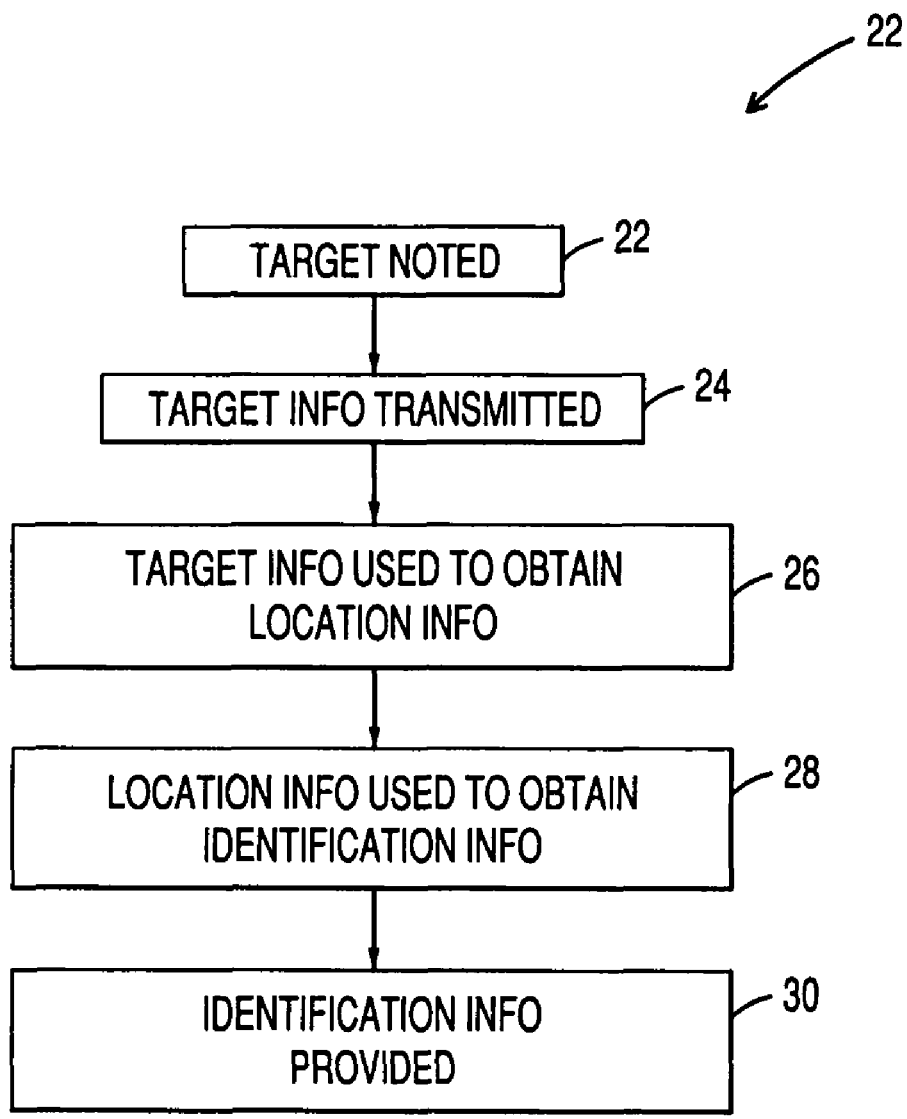
FIG. 2 is a flow diagram illustrating exemplary actions of the inventions.

The flow diagram of FIG. 2 is used to illustrate actions of an alternative embodiment of the inventions. Assume for this example that a courier is charged with delivering a summons to a company located in a particular building. The courier has been provided with the street address and has arrived in the general area, but is having difficulty in finding the particular building. The courier is equipped with a viewing apparatus that provides a display of the surroundings and may be used to obtain further information. The courier uses the viewing apparatus to select a building in the display of the surroundings as a "target" for further information such as identification as noted in action 22 of FIG. 2. Information regarding the target is transmitted or otherwise conveyed in action 24 to a module or other device that is used to obtain the further information.

In this example, the "target information" supplied by the viewing apparatus to the module is insufficient to identify the target. Additional information may be necessary to translate the target information eventually into identification information. The "target information" may constitute only an image of the target. Clues from the image of the target or surroundings may be used to obtain further information that may lead to identification. For example, the target information may be used in action 26 of FIG. 2 to obtain location information such as the geographic location of the target. The location information is used in action 28 to identify the target. In action 30, the identification information is provided to the viewing apparatus for display of the identification of the target to the courier. Based on the identification provided to the courier on the display of the viewing apparatus, the courier may determine whether the target the courier selected for further information constitutes the particular building to which the courier is to serve the summons.

Yet another alternative embodiment of the inventions provides identification information without the need for the user to select or target a location. In this embodiment, information regarding a location(s) within a specified radius of the viewing apparatus may be transmitted without any action on the part of the user through the communications network to a location identification device. The device returns identification or other information to the viewing apparatus for display to the user. In this embodiment, as the user moves through his or her surroundings, the identification information displayed may change to account for the changing locations in the surroundings. As another example, a user may be provided with a display of identification information related to locations in the surroundings displayed by the viewing apparatus. If the user turns around or other changes his or her orientation, the user may be provided with a different display of identification information to account for the different locations in the changed surroundings displayed by the viewing apparatus.

From the foregoing description of the exemplary embodiments of the inventions and operations thereof, other embodiments will suggest themselves to those skilled in the art. Therefore, the scope of the inventions is to be limited only by the claims below and equivalents thereof.

We claim:

1. A method for identifying a location, comprising:
    storing identification information associated with a delivery location, the identification information including a street address and a telephone number for the delivery location;
    providing a view of surroundings to a user device worn by the user in response to a position and orientation of the user, the view provided to the user device being the same user view as the user were not wearing the user device;
    determining a location in the view by determining the location in the view to be within a specified distance from the user and within an orientation of the view vis-a-vis the user orientation;
    receiving target data from the user device corresponding to the location in the view, the target data being an image of a target in the view of the surroundings;
    identifying the location in the view in response to the target data; and
    displaying, on the provided view of the user surroundings, identification information relating to the target data corresponding to the location on the view of the user surroundings to the user, the identification information including street address and telephone number for the delivery location to confirm that the image of the target is the delivery location.

2. The method of claim 1, wherein displaying the identification information comprises displaying the identification information in association with the location on the view of the user surroundings.

3. The method of claim 1, wherein identifying the location in the view includes using the position and the orientation of the user to identify the location.

4. The method of claim 1, wherein the viewing apparatus transmits the position and orientation of the user to a position/location service to generate the view of the surroundings.

5. The method of claim 1, wherein the viewing apparatus is worn in front of the user's eyes.

6. The method of claim 5, wherein the target data is selected by tracking user gaze at the viewing apparatus.

* * * * *